(12) United States Patent
Espinoza et al.

(10) Patent No.: US 8,468,054 B1
(45) Date of Patent: Jun. 18, 2013

(54) IDENTIFICATION RELATED TECHNOLOGY

(75) Inventors: Danny Javier Espinoza, Washington, DC (US); Andrew David Miller, Collinsville, CT (US)

(73) Assignee: Cardstar, Inc., Canton, CT (US)

( * ) Notice: Subject to any disclaimer, the term of this patent is extended or adjusted under 35 U.S.C. 154(b) by 328 days.

(21) Appl. No.: 12/861,273

(22) Filed: Aug. 23, 2010

Related U.S. Application Data (60) Provisional application No. 61/235,884, filed on Aug. 21, 2009.

(51) Int. Cl.
*G06F 7/08* (2006.01)
*G06K 7/10* (2006.01)
*H04M 3/42* (2006.01)

(52) U.S. Cl.
USPC .............. 705/14.27; 235/381; 235/462.01; 235/462.08; 455/414.2

(58) Field of Classification Search
USPC ............ 235/381, 462.01, 462.08; 455/414.2
See application file for complete search history.

(56) References Cited

U.S. PATENT DOCUMENTS

| | | | |
|---|---|---|---|
| 6,869,013 B2 * | 3/2005 | Allen et al. | 235/381 |
| 2002/0074405 A1 * | 6/2002 | Hadano et al. | 235/462.08 |
| 2003/0230630 A1 * | 12/2003 | Whipple et al. | 235/462.01 |
| 2008/0176543 A1 * | 7/2008 | Gravel et al. | 455/414.2 |

* cited by examiner

*Primary Examiner* — John Weiss
*Assistant Examiner* — Marilyn Macasiano
(74) *Attorney, Agent, or Firm* — Fish & Richardson P.C.

(57) ABSTRACT

Identification technology, in which a request related to generating conveyable information for a particular vendor is received based on user input provided by a particular user and mappings stored in a database are searched using an identifier associated with the particular vendor. At least one rule useful in generating conveyable information for the particular vendor is determined based on results of the searching and identification information for a type of conveyable information requested by the particular user is determined. Conveyable information is generated by applying the determined at least one rule to the determined identification information. A mobile device outputs the generated conveyable information to enable identification of the type of conveyable information requested by the particular user to a system of the particular vendor through the output of the mobile device.

19 Claims, 6 Drawing Sheets

IDENTIFICATION RELATED TECHNOLOGY

CROSS REFERENCE TO RELATED APPLICATIONS

The present application claims priority to U.S. Provisional Application No. 61/235,884, filed Aug. 21, 2009, which is incorporated herein by reference in its entirety for all purposes.

TECHNICAL FIELD

This disclosure relates to identification related technology.

BACKGROUND

Retail companies may use loyalty programs and/or coupons to promote business. A loyalty card may be a plastic or paper card that identifies a card holder as a member in a loyalty program. The loyalty card may include a printed bar code that is scanned by a retailer to identify a person as a member of the loyalty program. Based on the identification of the person as a member of the loyalty program, the retailer may provide the person with special deals/discounts and/or coupons the person may use to purchase products.

SUMMARY

In one aspect, this disclosure relates to identification related technology.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

DETAILED DESCRIPTION

In some implementations, a system maintains a mapping between vendor identifiers and rules/data useful in generating conveyable information (e.g., images such as barcodes, or radio-frequency identification (RFID) codes) that is used to identify a user (e.g., a member identification number) or another item (e.g., a coupon or promotion) and that is in a format understandable by the vendor's system. In these implementations, when a user needs to convey information to a vendor, the system receives, from the user, input identifying the vendor, accesses rules/data useful in generating conveyable information for the vendor by applying vendor identifying information to the mapping, and generates, using the user's mobile device (e.g., smart phone, PDA, etc.), the conveyable information based on the accessed rules/data. The system also may receive, from the user, the type of conveyable information needed (e.g., a store loyalty card, a coupon, etc.) and generate conveyable information of the needed type. Because the user's mobile device generates conveyable information for multiple, different vendors and/or conveyable information of multiple, different types, the user may be able to reduce a number of identification items (e.g., vendor loyalty cards or print coupons) the user carries.

For example, a system supplants customer loyalty cards, by enabling loyalty information (e.g., identifiers) to be identified to vendors using a virtual format such as that made possible if barcode images that typically appear on one side of a loyalty/rewards card were rendered by the display screen of a mobile device (e.g., smart phone, PDA, etc.). In this example, a user enters, into the mobile device, their loyalty card identification number and vendor identification information for their loyalty card. The mobile device identifies known symbologies (and, perhaps, transforms) for barcode patterning used by the vendor associated with the loyalty card and creates a representation of the barcode pattern printed on the user's loyalty card by applying the identified symbologies (and, perhaps, transforms) to the loyalty card identification number. The mobile device displays the created representation of the barcode pattern, which may be scanned and understood by barcode scanners (e.g., laser scanners and/or charge-coupled device (CCD) scanners) used by the vendor. Because the mobile device is capable of creating and displaying representations of barcode patterns for multiple, different vendors for which the user has a loyalty/rewards card, the user's need to carry many different loyalty cards may be reduced.

In addition, because certain barcode scanning technologies (e.g., laser scanning technologies) may have difficulty scanning barcodes displayed on a display screen (e.g., a liquid crystal display (LCD)) of a mobile device, modifications to the barcode symbologies may be made based on characteristics of the display screen and the mobile device. For instance, to achieve higher scan rates, the mobile device may purposefully change some of the characteristics of barcodes commonly generated under typical symbology standards. More particularly, the mobile device may make changes to the way that the symbologies generate barcodes, enabling scanning of even the most complex of symbologies with complex number configurations.

Figure 1:
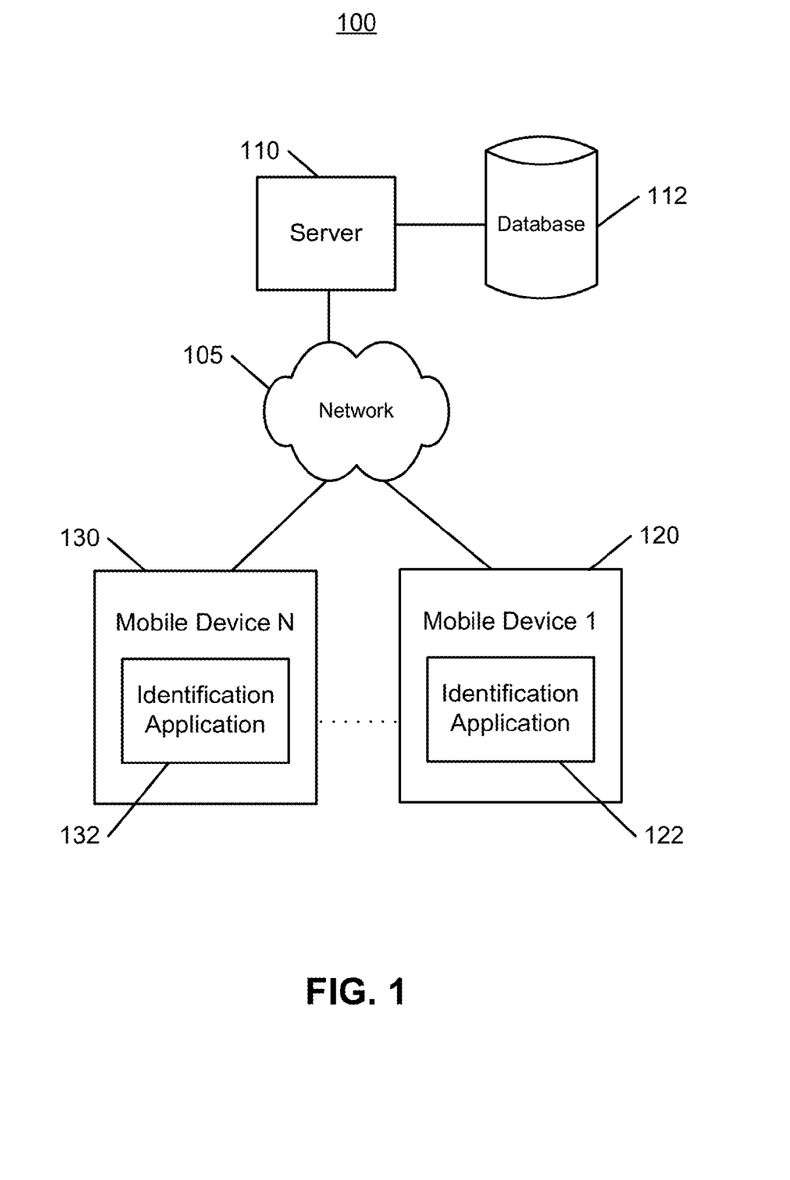
FIGS. 1 and 6 are diagrams of exemplary systems.

FIG. 1 illustrates an example of an electronic system 100. The electronic system 100 includes a network 105, a server 110, and one or more mobile devices 120, 130. In some examples, the network 105 facilitates communications between the server and the one or more mobile devices 120, 130.

The network 105 is configured to enable exchange of electronic communications between devices connected to the network 105. For example, the network 105 may be configured to enable exchange of electronic communications between the server 110 and the one or more mobile devices 120, 130. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The server 110 is an electronic device configured to execute programs and exchange communications with the one or more mobile devices 120, 130 over the network 105. For example, the server 110 may be configured to make an application available for downloading by the one or more mobile devices 120, 130 and exchange communications with the one or more mobile devices 120, 130 to assist the one or more mobile devices 120, 130 in executing the application. In this example, the one or more mobile devices 120, 130 may download an identification application from the server 110 and exchange communications with the server 110 to receive information needed by the identification application (e.g., barcode symbologies and vendor/barcode mappings) from the database 112.

The server 110 may communicate with the one or more mobile devices 120, 130 using any protocol that facilitates communications over network 105. For example, the server 110 may communicate with the one or more mobile devices 120, 130 using the hypertext transfer protocol (HTTP) or the secure hypertext transfer protocol (HTTPS).

The server 110 further may communicate with the database 112 to store and retrieve information used in executing an identification application. The server 110 may communicate with the database 112 using any appropriate protocol. The server 110 may communicate with the database 112 over a dedicated connection, a network other than the network 105 (e.g., a local area network of a company implementing the server 110 and the database 112), or the network 105. Although the server 110 has been described as a single server or electronic device, the server 110 may include any combination of multiple servers, computer systems, or other types of electronic devices.

The database 112 may be one or more locally or remotely accessible storage devices configured to store information used in executing an identification application. The database 112 may include one or more storage or memory devices configured to store electronic data. The storage or memory devices may be configured to store data using, for example, magnetic, optical, or solid state technologies. Although the database 112 is shown as being separate from the server 110, the database 112 may be part of the server 110, or mirrored on one or more mobile devices 120, 130.

The database 112 is configured to store information used in executing an identification application. For example, the database 112 may store a mapping between vendor identifiers and rules/data useful in generating conveyable information (e.g., images such as barcodes, or radio-frequency identification (RFID) codes) that is used to identify a user (e.g., a member identification number) or another item (e.g., a coupon or promotion) and that is in a format understandable by the vendor's system. In this example, the database 112 may store a list of vendors and barcode symbology used by each of the vendors included in the list. The database 112 also may store, for each of the vendors included in the list, transforms to member identification numbers (if any) needed to generate a barcode pattern that matches a barcode pattern used by the vendor to input a member identification number. The database 112 further may store information necessary to authenticate users to the server 110 and set access privileges for the users.

The one or more mobile devices 120, 130 are devices that host and display user interfaces and that host one or more native applications (e.g., the identification application 122, 132). The one or more mobile devices 120, 130 may be cellular phones or non-cellular locally networked devices with displays. The one or more mobile devices 120, 130 may include a cell phone, a smart phone, a tablet PC, a personal digital assistant ("PDA"), or any other portable device configured to communicate over a network and display information. For example, implementations may include Blackberry-type devices (e.g., as provided by Research in Motion), electronic organizers, iPhone-type devices (e.g., as provided by Apple), iPod devices (e.g., as provided by Apple) or other portable music players, Android-type devices (e.g., as provided by Google), other communication devices, and handheld or portable electronic devices for gaming, communications, and/or data organization. The one or more mobile devices 120, 130 may be the same or may include mobile devices of different types. The one or more mobile devices 120, 130 may be configured to perform operations, such as placing personal telephone calls, playing music, playing video, displaying pictures, browsing the Internet, maintaining an electronic calendar, etc.

The one or more mobile devices 120, 130 each include an identification application 122, 132, respectively. The identification application 122, 132 refers to a software/firmware program running on the corresponding mobile device that enables the user interfaces and features described throughout this disclosure. The one or more mobile devices 120, 130 may load or install the identification application 122, 132 based on data received over the network 105 from the server 110 or data received from local media. The identification application 122, 132 runs on mobile device platforms, such as iPhone, iPod touch, Blackberry, Google Android, Windows Mobile, etc.

The identification application 122, 132 controls the one or more mobile devices 120, 130 to generate identification for conveyance to one or more vendors. For instance, the identification application 122, 132 may generate barcode representations to display, may generate RFID identification signals, and/or may generate any other type of signal or image that is used to identify a user or an item. The identification application 122, 132 enables a user to add new identifying information (e.g., new loyalty cards) for the user and select, from among multiple, different items of identifying information, which identifying information (e.g., which loyalty card) the user needs the one or more mobile devices 120, 130 to generate. The identification application 122, 132 allows a user to store, manage and retrieve reward, club, loyalty and other membership cards on the one or more mobile devices 120, 130, where the reward, club, loyalty and other membership cards can be scanned directly from the mobile device display.

Figure 2:
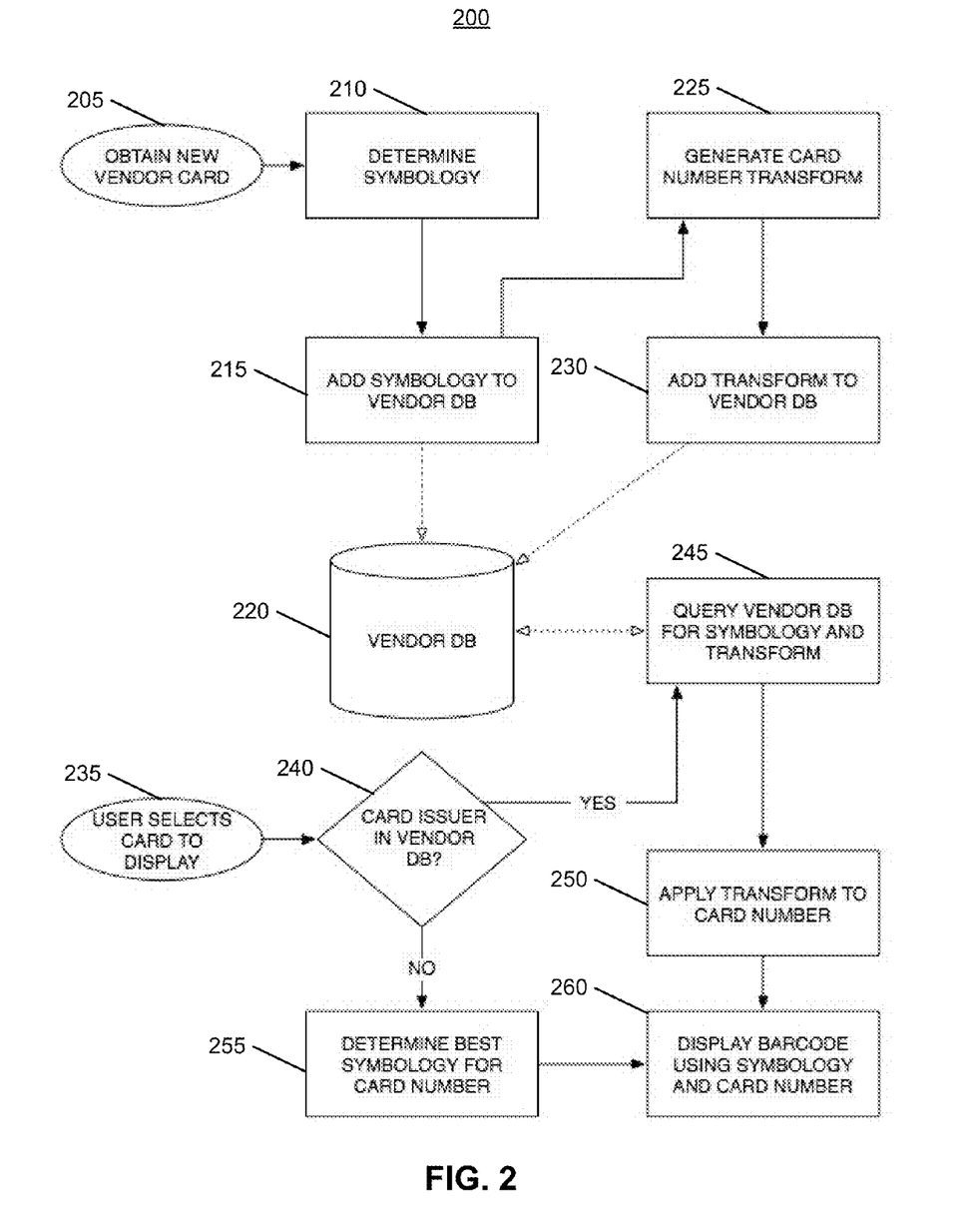
FIGS. 2, 4, and 5 are flowcharts of exemplary processes.

FIG. 2 illustrates a process 200 for adding vendor identification information to a database and using vendor identification information to generate conveyable information for vendors. The operations of the process 200 are described generally as being performed by the system 100. The operations of the process 200 may be performed one of the components of the system 100 or may be performed by a combination of the components of the system 100. In some implementations, operations of the process 200 may be performed by one or more processors included in one or more electronic devices.

The system 100 receives information related to a new vendor card (205). For instance, the system 100 receives user input from an operator that identifies a new vendor card that is presently not available in the vendor database 220. The vendor database 220 may be similar to the database 112 described above with respect to FIG. 1.

The system 100 determines the symbology associated with the new vendor card (210) and adds the determined symbology to the vendor database 220 (215). For example, the system 100 may determine the symbology based on received user input that indicates the symbology. In this example, an operator may obtain the new vendor card and compare the barcode displayed on the new vendor card to known barcode symbologies. When the operator identifies a matching symbology, the operator may provide user input to the system 100 indicating the symbology used on the new vendor card. The system 100 receives the user input, determines the symbology from the user input, and stores, in the vendor database 220, the determined symbology in association with identifying information (e.g., a vendor name) for the vendor corresponding to the new vendor card. Storing the determined symbology in association with vendor identifying information enables the system 100 to look up the symbology used by the vendor any time the system 100 needs to generate a barcode for the vendor.

In some implementations, the system 100 performs an automated process to determine the symbology. In these implementations, the system 100 may query another electronic device (e.g., a server for the vendor) and receive symbology information for the vendor in response to the query. The system 100 also may access an image of the barcode printed on the new vendor card and determine the symbology from the image. For instance, the system 100 may compare the accessed image of the barcode to known symbology patterns and determine the symbology of the barcode based on the comparison. When the system 100 determines the symbology with a sufficient degree of confidence, the system 100 stores, in the vendor database 220, the determined symbology in association with identifying information (e.g., a vendor name) for the vendor corresponding to the new vendor card.

In addition, the system 100 determines whether a card number transform is needed for the new vendor card and, if so, generates the card number transform (225). For example, the system 100 may determine whether a card number transform is needed for the new vendor card based on received user input that indicates whether a card number transform is needed. In this example, an operator may obtain the new vendor card and generate barcodes having the same identification number using known barcode symbologies. The operator compares the generated barcodes to the barcode printed on the new vendor card and, when none of the generated barcodes match, the operator determines that a card number transform is needed and performs additional investigation to discover the card number transform.

In some implementations, a card number transform accounts for additional information included in the barcode printed on the vendor card that is not present in the card number (e.g., member identification number) found on the card. For example, the vendor may encode, within the barcode, additional information prior to and/or after the card number. Encoding additional information prior to the card number may be referred to as prefixing and encoding additional information after the card number may be referred to as postfixing. In these implementations, the operator determines the prefixing and/or postfixing used by the vendor and provides user input to the system 100 indicating the prefixing and/or postfixing used on the new vendor card. The system 100 then is able to account for the prefixing and/or postfixing by transforming an entered card number (e.g., by adding additional characters) prior to generating the barcode corresponding to the card number using the symbology determined for the vendor.

In some examples, a card number transform accounts for additional information included in the card number (e.g., member identification number) found on the card, but that is not present in the barcode printed on the vendor card. For instance, the vendor may include additional characters in the card number printed on the vendor card, but not encode the additional characters in the barcode. In these examples, the operator determines the additional characters (e.g., an additional character pattern) used by the vendor and provides user input to the system 100 indicating the additional characters. The system 100 then is able to account for the additional characters by transforming an entered card number to remove the additional characters prior to generating the barcode corresponding to the card number using the symbology determined for the vendor.

A card number transform also may account for inversion performed by a vendor. For instance, some vendors may invert the visual representation of a barcode. The system 100 may account for such inversion (or other geometric or mathematical conversion or manipulation) in generating a barcode based on a card number.

The system 100 may determine that a card number transform is not needed when the operator does not provide user input related to a card number transform. Alternatively, the system 100 may determine that a card number transform is not needed when the operator provides user input indicating that a card number transform is unnecessary.

The system 100 also may perform an automated process to determine card number transforms. For example, the system 100 may query another electronic device (e.g., a server for the vendor) and receive card number transform information for the vendor in response to the query. In addition, the system 100 may access an image of the barcode printed on the new vendor card and determine a card number transform from the image. The system 100 may compare the accessed image of the barcode to known symbology patterns and determine the card number transform of the barcode based on the comparison. The system 100 determines the card number transform when the system 100 identifies a card number transform for a known symbology that meets a sufficient degree of confidence.

In some cases, combinations of card number transforms may be needed to properly generate a barcode for a vendor based on an identification number. For example, the system 100 may remove the first two characters of an identification number and add a specific three character code to the end of the identification number to properly generate a barcode recognizable by the vendor. Further, the system 100 (or an operator) may analyze multiple samples of vendor cards for a new vendor to determine a symbology and card number transform used by the vendor. Analysis of multiple samples may help improve the ability to determine the symbology and/or transform used by the vendor.

The system 100 adds the generated card number transform to the vendor database 220 (230). For instance, the system 100 stores, in the vendor database 220, the generated card number transform in association with identifying information (e.g., a vendor name) for the vendor corresponding to the new vendor card. Storing the generated card number transform in association with vendor identifying information enables the system 100 to look up the card number transform used by the vendor any time the system 100 needs to generate a barcode for the vendor.

The system 100 receives user input selecting a vendor card to display (235). For instance, the system 100 displays a list of vendors for which the user has registered a card and receives user input selecting one of the vendors included in the list.

In response to the user input selecting a vendor card to display, the system 100 determines whether the vendor corresponding to the selected card is included in the vendor database 220 (240). For example, the system 100 compares identifying information for the vendor corresponding to the selected card to identifying information for vendors included in the vendor database 220.

When a match is found and the vendor is included in the vendor database 220, the system 100 queries the vendor database 220 for symbology and transform data stored for the vendor (245) and applies the transform returned from the query to the card number of the selected vendor card (250). For instance, the system 100 accesses transform information from the vendor database 220 and manipulates a card number entered by the user based on the transform. The card number may be entered by the user during a registration process and accessed each time the system 100 is requested to generate a barcode for the vendor card.

When a match is not found and the vendor is not included in the vendor database 220, the system 100 determines the best symbology for the card number (255). For example, the system 100 may select the most popular symbology that accommodates the number of characters entered in the card number. When the best symbology is predicted, the system 100 may include a feedback loop that identifies whether or not the predicted symbology was successful. The feedback loop may be used to update the vendor database 220 to indicate when the vendor is known to use a particular symbology or indicate that a particular symbology did not work for the vendor when the card number was not transformed. The system 100 may predict future symbologies using the feedback data.

The system 100 generates and displays a barcode using the symbology and card number (e.g., the transformed card number if a transform was applied) (260). For example, the system 100 displays the generated barcode on a display of a mobile device operated by the user. In this example, the user may provide loyalty card information to the vendor by scanning across the vendor's barcode scanner the mobile device having the displayed barcode. The process 400 described below with respect to FIG. 4 may be used to generate and display the barcode.

Figure 3:
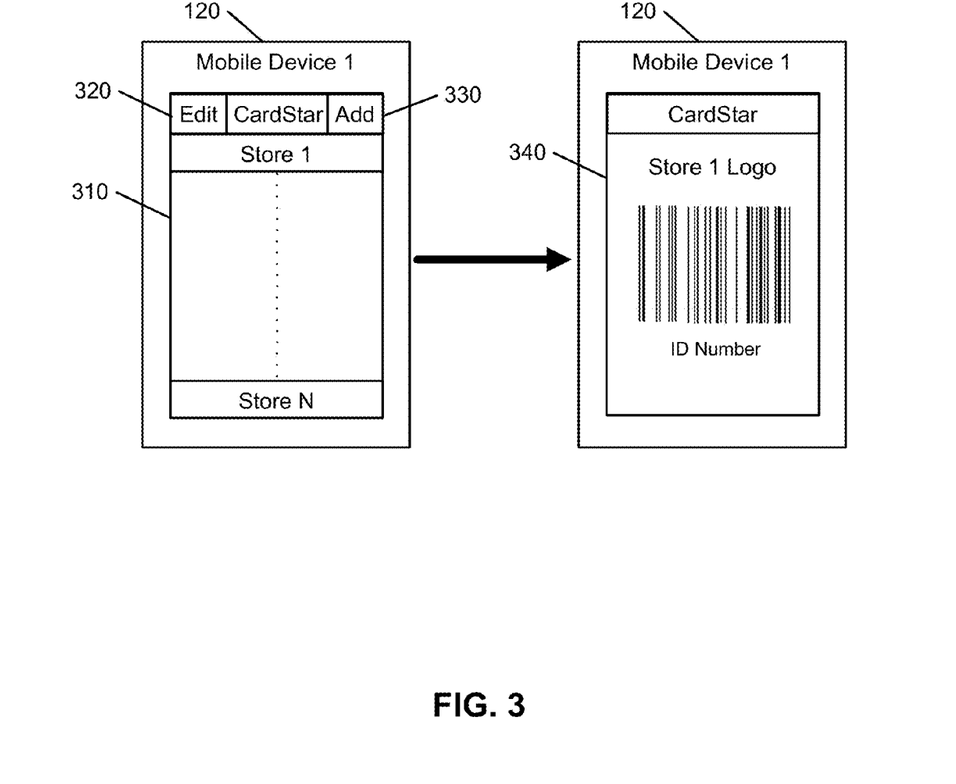
FIG. 3 is a diagram of an example of using a mobile device to display a barcode corresponding to a user's loyalty card.

FIG. 3 illustrates a diagram 300 showing an example of using a mobile device to display a barcode corresponding to a user's loyalty card. As shown, the display (e.g., an LCD display) of the mobile device 120 displays an interface 310 including a list of stores for which the user has registered a loyalty card. Registration of loyalty cards may include providing input identifying a store and input identifying a loyalty card number for the user's loyalty card associated with the store. The edit control button 320 allows a user to edit loyalty card information registered for a store included in the displayed list. The add control button 330 allows a user to add loyalty card information for a new store that is not presently included in the displayed list.

When the user needs to scan a loyalty card at a store, the user selects one of the stores included in the list displayed in the interface 310 and the mobile device 120 displays the corresponding barcode. For example, when the mobile device 120 receives a selection of Store 1, the mobile device 120 accesses symbology and card number transform information stored for Store 1 and applies the accessed symbology and card number transform information to the loyalty card number the user provided for Store 1 to generate a barcode. The generated barcode is then displayed on the display of the mobile device 120 as interface 340. The interface 340 includes a logo for Store 1, the generated barcode, and the loyalty card number used to generate the barcode. The user may scan the interface 340 across a barcode scanner of Store 1 to enter the loyalty card information for Store 1. The displayed barcode may be modified from the symbology used by Store 1 to improve scan rates for the mobile device 120. The process 400 described below with respect to FIG. 4 may be used to generate and display the barcode.

Other information may be displayed in the interface 310 and the interface 340. In addition, each vendor may have customized information displayed on interface 340. For instance, the database may include a switch to enable turning on/off of graphics on a per-vendor basis, to enable control over logos displayed by devices in the field between upgrades. For a logo to be displayed (or any barcode at all), the switch at the database must be set at an "on" position.

Figure 4:
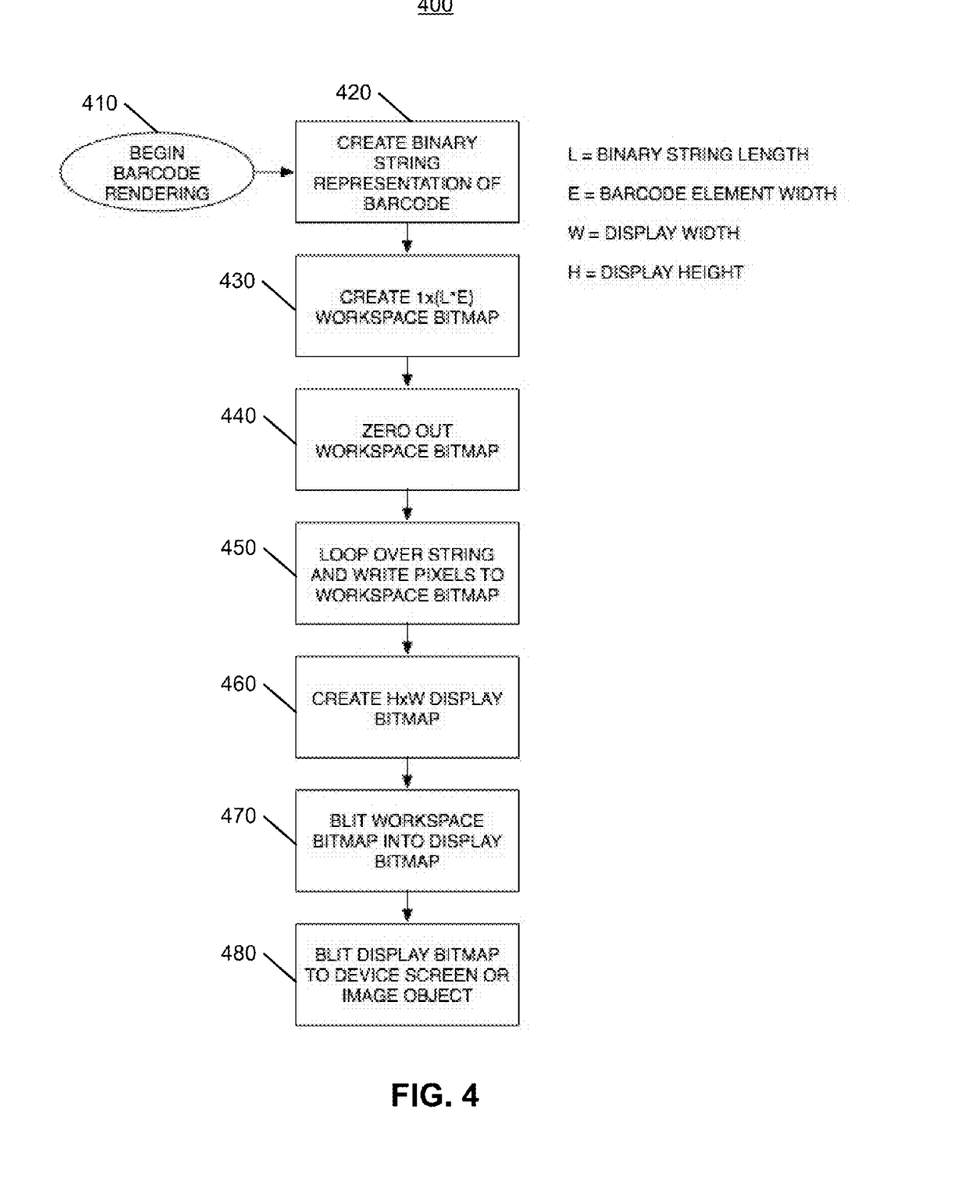

FIG. 4 illustrates a process 400 for generating and displaying a barcode. The process 400 enables control over barcode scaling, bar element width, and barcode height. The operations of the process 400 are described generally as being performed by the system 100. The operations of the process 400 may be performed one of the components of the system 100 or may be performed by a combination of the components of the system 100. In some implementations, operations of the process 400 may be performed by one or more processors included in one or more electronic devices.

The system 100 begins barcode rendering (410). For instance, the system 100 receives a user input command to display a barcode and initiates a rendering process.

The system 100 creates a binary string representation of the barcode (420). For instance, the system 100 creates a binary representation of the barcode elements (e.g., bars and spaces) in a string based on the identification number corresponding to the barcode. The system 100 accounts for any needed transformations to the identification number before creating the binary string. The binary string length (L) is variable based on the number of characters included in the binary representation of the identification number for the barcode symbology being used.

The system 100 creates a workspace bitmap based on the binary string length (L) and a barcode element width (E) variable (430). For instance, the barcode element width (E) may vary based on user input such that bar or space thickness is controlled. The barcode element width (E) may be set to any number of pixels or bits in the workspace bitmap. Changing the barcode element width may assist in improving scan rates for certain mobile devices and certain scanning technologies. The system 100 creates the workspace bitmap to have a height of one bit and a width of L*E bits. The pixel depth of the workspace bitmap may be set to one.

After creating the workspace bitmap, the system 100 zeroes out the workspace bitmap (440). The system 100 zeroes out the workspace bitmap by writing zero values to all of the bits of the workspace bitmap.

After zeroing out the workspace bitmap, the system 100 loops over the created binary string and writes pixels to the workspace bitmap (450). For example, the system 100 defines a variable indicating a position in the workpace bitmap, which initially is set to zero. The system 100 loops over every character in the created binary string and determines whether the character has a one value or a zero value. When a character has a one value, the system 100 sets E pixels to black at the current position in the workspace bitmap. When a character has a zero value, the system 100 sets (or maintains) E pixels to white at the current position in the workspace bitmap. After setting the pixels for a character, the system 100 increments the position variable by E and processes the next character in the string.

The system 100 creates a display bitmap (460). The system 100 creates the display bitmap to have a height of H pixels and a width of W pixels, where H is the height of the barcode and W is the width of the barcode that will be displayed on the device screen. The height H and width W are variables that may be controlled to improve scan rates based on display properties of the mobile device being used to display the barcode. The system 100 sets the pixel depth of the display bitmap to the pixel depth of the device screen (e.g., 24 or 32 bits).

The system 100 combines (e.g., blits) the workspace bitmap into the display bitmap (470). For example, the system 100 scales a width of the workspace bitmap to match the width of the display bitmap (if necessary). In this example, after scaling the width of the workspace bitmap, the system 100 copies the workspace bitmap into each row of the display bitmap along the height because the workspace bitmap is only one pixel in height.

The system 100 combines (e.g., blits) the display bitmap into a device screen or image object (480). For instance, the system 100 displays the barcode with the pixels displayed on the device screen being representative of the pixels in the display bitmap.

The variables used throughout FIG. 4 (e.g., E, H, and W) may be varied based on the device being used to display the barcode. For instance, the same barcode may be displayed on different devices, but with different values for E, H, and W that are optimized for the device being used. Varying values for E, H, and W also may be defined for different symbologies and/or different scanning technology.

Other modifications in generating barcodes may be made. For example, the system 100 may adjust colorization at boundaries of barcode elements. In this example, the system 100 may adjust the RGB values of pixels at the black and white pixel boundaries in the barcode to enhance colors that better reflect light (e.g., laser light) emitted by barcode scanners. In another example, the system 100 may adjust widths of barcode elements to account for attributes of a mobile device display (e.g., magnification or other interference caused by a cover positioned over the display). In this example, the system 100 may increase a width of outer barcode elements and/or reduce a width of inner barcode elements. The system 100 also may increase a width of black barcode elements while decreasing a width of white barcode elements.

Figure 5:
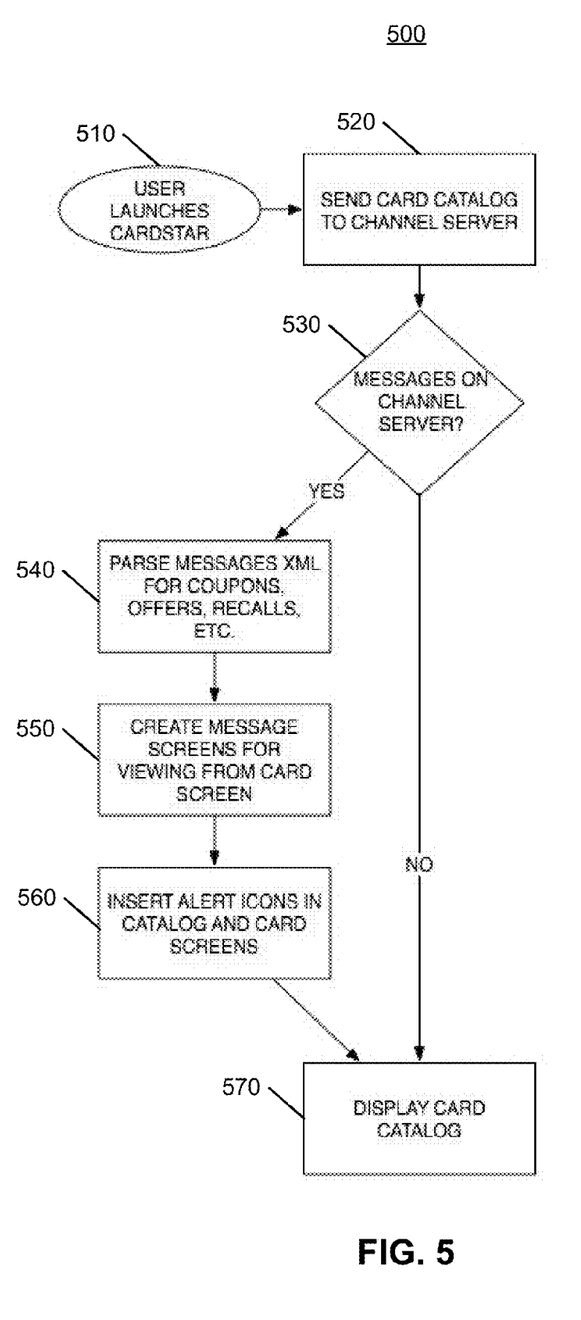

FIG. 5 illustrates a process 500 for handling messages and alerts related to loyalty cards.

The operations of the process 500 are described generally as being performed by the system 100. The operations of the process 500 may be performed one of the components of the system 100 or may be performed by a combination of the components of the system 100. In some implementations, operations of the process 500 may be performed by one or more processors included in one or more electronic devices.

The system 100 launches an identification application (e.g., a loyalty card identification application) based on user input (510). For instance, the system 100 may receive a user input command starting the application on a mobile device. The application also may be running at all times as a background process.

In response to the user launching the application, the system 100 sends a card catalog to channel server (520). For instance, the application running on the mobile device sends a list of loyalty cards the user has registered with the application. The list of loyalty cards may be indicative of stores at which the user frequently shops.

The system 100 determines whether messages exist on the channel server that are associated with the card catalog (530). For instance, the system 100 compares the list of loyalty cards to available messages and determines whether any available messages are associated with a loyalty card included in the list. Messages correspond to a loyalty card when the messages are originated by the store associated with the loyalty card (e.g., promotions, announcements, etc.). Messages also may correspond to a loyalty card when the messages are for a product sold by the store associated with the loyalty card (e.g., promotions, announcements, product recalls, etc.). Messages further may correspond to a loyalty card when the messages are originated by a competitor of the store associated with the loyalty card that wishes to alert customers of the store that the competitor has a promotion or other special.

When the system 100 determines that no messages exist, the system 100 does not modify the card catalog displayed. However, when the system 100 determines that messages do exist, the system 100 delivers the messages from the channel server to the mobile device and parses the messages (e.g., XML messages) for coupons, offers, recalls, etc. (540).

Based on the parsing, the system 100 creates message screens related to the coupons, offers, recalls, etc. for viewing from the loyalty card display screen (550) and inserts alert icons in the card catalog and card screens (560). For example, the system 100 modifies the displayed card catalog screen to alert a user when a message corresponding to a loyalty card exists. In this example, the alert may be configured to link to the message screen created for the message and enable a user to perceive the message corresponding to the loyalty card by selecting the alert. An alert may be arranged, in the card catalog interface, in association with (e.g., adjacent to) the loyalty card corresponding to the alert.

The system 100 displays the card catalog based on any modifications made to alert the user to messages (570). As such, when the user views the list of loyalty cards, the system 100 alerts the user to loyalty cards associated with messages. The system 100 then displays the message corresponding to an alert when the user provides input indicating a desire to perceive the message. By providing the user with messages related to loyalty cards the user uses, the system 100 may provide relevant messages to the user that are targeted to the user's preferences.

In some implementations, the system 100 collects data related to when a user uses loyalty cards and identifies shopping patterns of the user. In these implementations, the system 100 maps vendor transactions, and determines that users who shop at a first store (or first type of store) then tend to migrate to a second store (or second type of store). The system 100 uses this type of shopping pattern information to target promotions to the user. For instance, when the user is detected as using a loyalty card at a first store (or first type of store), the system 100 sends a promotion to the user for the second store (or second type of store).

In some examples, the system 100 uses location aware mobile services (e.g., GPS technology) to target promotions and enhance user experience. In these examples, the system 100 may alert or provide a promotion to a user when the user is determined to be geographically proximate to a store for which the user has registered a loyalty card. The system 100 may consider only stores for which the user has registered a loyalty card in providing geographically targeted messages to limit the messages the user receives to those stores in which the user is known to be interested.

In addition, location aware mobile services may be used to enhance user experience. For example, the system 100 may detect that a user has entered a store for which the user has registered a loyalty card and automatically begin conveying identification information for the user to the store. In this example, the system 100 may automatically display the barcode of the store without requiring the user to select the store name from a list. When RFID technology is used to identify the user, the system 100 may automatically generate an RFID signal corresponding to the user such that RFID detectors in the store may be able to identify the user without the user having to remove his or her mobile device from a pocket or purse.

In some examples, the system 100 may offer a virtual loyalty program for stores that do not currently offer a loyalty program. In these examples, the system 100 may gather all of the information needed for a loyalty program and assign identification numbers to users. The system 100 may manage the loyalty program and provide the stores with information necessary to provide users with rewards earned through the virtual loyalty program. In addition, the system 100 may bundle loyalty partners into a bundled virtual loyalty program. The bundled loyalty program may allow users to accrue rewards credit across multiple, different loyalty programs and, thereby, achieve a higher value reward than attainable with any program individually.

Further, the system 100 may accommodate paid membership customer identification programs and provide security features that limit the ability of users to copy identification information of a valid member to gain access to the paid membership store. The system 100 may update the barcode display interface to include information that the store clerk can use to verify that the user has a valid membership to the store at the time of checkout. For instance, the system 100 may display a watermark or other code on the barcode display that enables the clerk to determine whether the membership is valid.

In some examples, the system 100 may have an agreement with the paid membership store to obtain information from the paid membership store that assists in reducing customer misuse. In these examples, when a user adds a membership card to the system 100 for the paid membership store, the system 100 may receive, from the paid membership store, a digital photograph of the valid member corresponding to the membership identifier entered by the user. The system 100 may display the digital photograph with the barcode for the membership card such that a clerk at the store may compare the digital photograph with the person attempting to use the membership barcode displayed on the mobile device. In addition, the 100 may receive, from the paid membership store, a phone number of the valid member corresponding to the membership identifier entered by the user. The system 100 may compare the received phone number to a phone number of the mobile device with which the user is attempting to add the membership card and only allow the user to add the membership card when the comparison reveals that the phone numbers match.

In other examples, the system 100 may track the number of devices that add a particular membership card and limit the number of devices based on a requirement of the paid membership store. In these examples, the system 100 may prevent requests to add the particular membership card after a threshold number of users have added the particular membership card.

Figure 6:
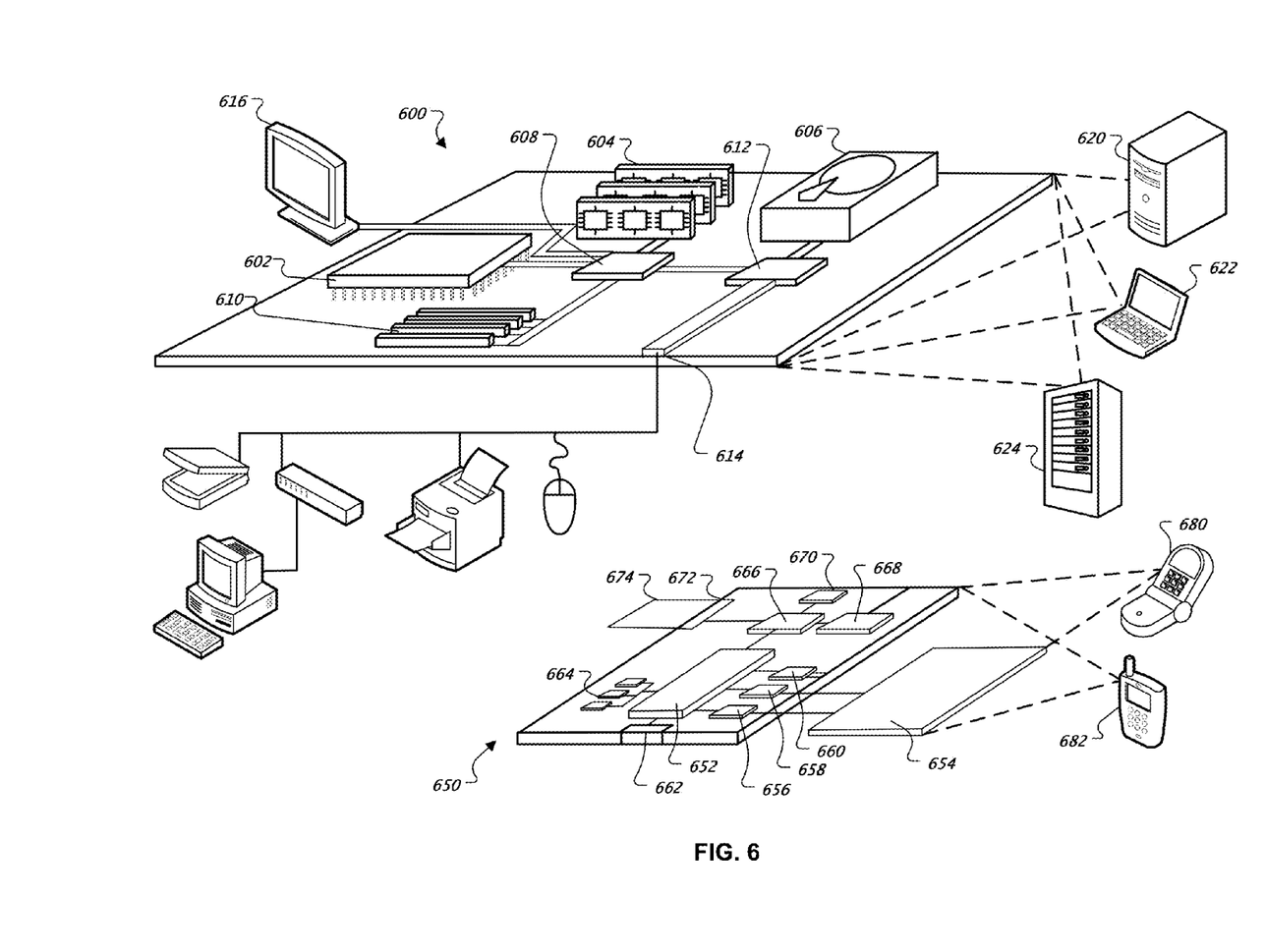

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the approaches described in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple busses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards. In this implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device, such as device 650. Each of such devices may contain one or more of computing devices 600, 650, and an entire system may be made up of multiple computing devices 600, 650 communicating with each other. The computing device 600 may include one or more sensors, such as gyroscopes, cameras or GPS (Global Positioning Satellite) trackers, configured to detect or sense motion or position of the computing device 600.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various busses, and several of the components may be mounted on a common motherboard or in other manners as appropriate. The computing device 650 may include one or more sensors, such as gyroscopes, cameras or GPS (Global Positioning Satellite) trackers, configured to detect or sense motion or position of the computing device 650.

The processor 652 may process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver. In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. An identification system comprising:
   a database storing mappings between vendor identifiers and rules useful in generating conveyable information that is used to identify a user or another item and that is in a format understandable by a system used by a vendor that corresponds to a vendor identifier, the mappings including at least:
   a first mapping between a first vendor identifier and a first rule useful in generating conveyable information that is used to identify a user or another item and that is in a first format understandable by a system used by a first vendor that corresponds to the first vendor identifier, and
   a second mapping between a second vendor identifier and a second rule useful in generating conveyable information that is used to identify a user or another item and that is in a second format understandable by a system used by a second vendor that corresponds to the second vendor identifier, the second mapping being different than the first mapping, the second vendor identifier being different than the first vendor identifier, the second rule being different than the first rule, the second format being different than the first format, and the second vendor being different than the first vendor; and
   a processing device that is configured to communicate with the database and that is configured to perform operations comprising:
   receiving, based on user input provided by a particular user, a request related to generating conveyable information for a particular vendor;
   based on the request, searching the mappings stored in the database using an identifier associated with the particular vendor;
   based on results of the searching, determining at least one rule useful in generating conveyable information for the particular vendor, the determining at least one rule useful in generating conveyable information for the particular vendor comprising determining a transform needed to transform the identification information into the format understandable by the system used by the particular vendor;
   determining identification information for a type of conveyable information requested by the particular user from which the request was received;
   generating conveyable information understandable by a system used by the particular vendor by applying the determined at least one rule useful in generating conveyable information for the particular vendor to the determined identification information for the type of conveyable information requested by the particular user; and
   causing, at a mobile device, output of the generated conveyable information to enable identification of the type of conveyable information requested by the particular user to a system of the particular vendor through the output of the mobile device.

2. The identification system of claim 1:
   wherein receiving, based on user input provided by the particular user, the request related to generating conveyable information for the particular vendor comprises receiving user input selecting, from among options including at least loyalty program information for the particular vendor and a coupon accepted by the particular vendor, the type of conveyable information requested by the particular user; and
   wherein determining identification information for the type of conveyable information requested by the particular user from which the request was received comprises:
   determining the type of conveyable information selected by the particular user based on the received user input; and
   determining identification information for the determined type of conveyable information by:
   determining loyalty program identification information for the particular user at the particular vendor when the determined type of conveyable information is loyalty program information for the particular vendor; and
   determining coupon identification information for the coupon accepted by the particular vendor when the determined type of conveyable information is the coupon accepted by the particular vendor.

3. The identification system of claim 1:
   wherein the database stores mappings between vendor identifiers and rules useful in generating conveyable information that is used to identify users;
   wherein determining identification information for the type of conveyable information requested by the particular user from which the request was received comprises determining, for the particular user, an identifier the particular vendor uses to identify the particular user;
   wherein generating conveyable information comprises applying the determined at least one rule useful in generating conveyable information for the particular vendor to the determined identifier the particular vendor uses to identify the particular user; and
   wherein causing, at the mobile device, output of the generated conveyable information to enable identification of the type of conveyable information requested by the particular user to a system of the particular vendor through the output of the mobile device comprises causing, at the mobile device, output of the generated conveyable information to enable the system of the particular vendor to recognize the determined identifier through the output of the mobile device.

4. The identification system of claim 3:
wherein the database stores mappings between vendor identifiers and rules useful in generating representations of barcodes used by vendors to represent loyalty program identifiers of users;
wherein determining, for the particular user, the identifier the particular vendor uses to identify the particular user comprises determining, for the particular user, a loyalty program identifier the particular vendor uses to identify the particular user;
wherein determining at least one rule useful in generating conveyable information for the particular vendor comprises determining at least one rule for generating a barcode recognizable by a system used by the particular vendor when displayed on a mobile device;
wherein generating conveyable information comprises generating a representation of a barcode by applying the determined at least one rule for generating a barcode recognizable by a system used by the particular vendor when displayed on a mobile device to the determined loyalty program identifier the particular vendor uses to identify the particular user; and
wherein causing, at the mobile device, output of the generated conveyable information to enable the system of the particular vendor to recognize the determined identifier through the output of the mobile device comprises causing, at the mobile device, display of the generated representation of the barcode to enable the system of the particular vendor to scan the displayed representation of the barcode and, thereby, recognize the loyalty program identifier the particular vendor uses to identify the particular user.

5. The identification system of claim 1:
wherein the database stores mappings between vendor identifiers and rules useful in generating conveyable information that is used to identify coupons;
wherein determining identification information for the type of conveyable information requested by the particular user from which the request was received comprises determining an identifier for a coupon accepted by the particular vendor;
wherein generating conveyable information comprises applying the determined at least one rule useful in generating conveyable information for the particular vendor to the determined identifier for the coupon accepted by the particular vendor; and
wherein causing, at the mobile device, output of the generated conveyable information to enable identification of the type of conveyable information requested by the particular user to a system of the particular vendor through the output of the mobile device comprises causing, at the mobile device, output of the generated conveyable information to enable the system of the particular vendor to recognize the determined identifier for the coupon through the output of the mobile device.

6. The identification system of claim 1:
wherein the mappings stored in the database further include a third mapping between a third vendor identifier and the first rule useful in generating conveyable information that is used to identify a user or another item and that is in the first format understandable by a system used by a third vendor that corresponds to the third vendor identifier, the third mapping being different than the first and second mappings, the third vendor identifier being different than the first and second vendor identifiers, and the third vendor being different than the first and second vendor; and
wherein determining at least one rule useful in generating conveyable information for the particular vendor comprises:
determining the first rule when the particular vendor is the first vendor and the results of the searching match the first mapping in the database; and
determining the second rule when the particular vendor is the second vendor and the results of the searching match the second mapping in the database; and
determining the first rule when the particular vendor is the third vendor and the results of the searching match the third mapping in the database.

7. The identification system of claim 1, wherein determining the transform needed to transform the identification information into the format understandable by a system used by the particular vendor comprises determining a number transform needed to transform a first identification number entered by the particular user into a second identification number recognizable by the system used by the particular vendor when conveyed to the system in a barcode representation, the number transform including at least one of removing one or more digits from the first identification number and adding one or more digits to the first identification number.

8. The identification system of claim 1, wherein determining at least one rule useful in generating conveyable information for the particular vendor further comprises determining a symbology used in the format understandable by the system used by the particular vendor.

9. The identification system of claim 1, wherein determining at least one rule useful in generating conveyable information for the particular vendor further comprises determining barcode generation information needed to generate a barcode in a barcode format understandable by the system used by the particular vendor when the barcode is displayed on a display screen of the mobile device.

10. The identification system of claim 1:
wherein determining at least one rule useful in generating conveyable information for the particular vendor comprises determining at least one rule that indicates modifications to an exact format of conveyable information understandable by the system used by the particular vendor that enhance recognition of the conveyable information by the system used by the particular vendor when the conveyable information is output through the mobile device, the exact format being a format of the conveyable information used in an identification product provided to the particular user by the particular vendor; and
wherein generating conveyable information comprises generating a modified format of the conveyable information understandable by the system used by the particular vendor by applying, to the determined identification information for the type of conveyable information requested by the particular user, the determined at least one rule that indicates modifications to the exact format, the modified format being different than the exact format.

11. The identification system of claim 1, wherein determining at least one rule useful in generating conveyable information for the particular vendor further comprises determining whether the identifier associated with the particular vendor exists in the mappings stored in the database based on results of the searching.

12. The identification system of claim 11, wherein determining at least one rule useful in generating conveyable information for the particular vendor further comprises, in response to a determination that the identifier associated with the particular vendor exists in the mappings stored in the database based on results of the searching, querying the database for a symbology and the transform.

13. The identification system of claim 12:
wherein determining identification information for the type of conveyable information requested by the particular user from which the request was received comprises determining, for the particular user, a loyalty program identifier the particular vendor uses to identify the particular user;
wherein generating conveyable information comprises:
determining a transformed loyalty program identifier by applying the transform used by the particular vendor to the loyalty program identifier the particular vendor uses to identify the particular user; and
generating, using the symbology and the transformed loyalty program identifier, a representation of a barcode that conveys the loyalty program identifier to the particular vendor when scanned by a barcode scanner included in the system used by the particular vendor.

14. The identification system of claim 11:
wherein determining identification information for the type of conveyable information requested by the particular user from which the request was received comprises determining, for the particular user, a loyalty program identifier the particular vendor uses to identify the particular user;
wherein determining at least one rule useful in generating conveyable information for the particular vendor further comprises, in response to a determination that the identifier associated with the particular vendor does not exist in the mappings stored in the database based on results of the searching, inferring a symbology used by the particular vendor based on at least one characteristic of the loyalty program identifier; and
wherein generating conveyable information comprises generating, using the inferred symbology and the loyalty program identifier, a representation of a barcode that conveys the loyalty program identifier to the particular vendor when scanned by a barcode scanner included in the system used by the particular vendor.

15. The identification system of claim 1:
wherein generating conveyable information comprises generating a representation of a barcode for display on a display screen of the mobile device by:
creating a binary string representation of the barcode;
creating a workspace bitmap based on a length of the binary string and a barcode element width variable;
zeroing out the workspace bitmap;
looping over the binary string and writing pixels to the workspace bitmap;
creating a display bitmap based on a height of the display screen of the mobile device and a width of the display screen of the mobile device; and
combining the workspace bitmap into the display bitmap;
wherein causing, at the mobile device, output of the generated conveyable information comprises causing, on the display screen of the mobile device, display of the generated representation of the barcode based on the display bitmap.

16. The identification system of claim 1, wherein the operations further comprise:
determining whether one or more messages exist on a channel server for the particular user based on a card catalog of the particular user, the card catalog being a list of loyalty cards the particular user has registered with the identification system; and
in response to a determination that one or more messages exist on the channel server for the particular user based on the card catalog of the particular user, displaying the card catalog of the particular user with additional information representative of the one or more messages that exist on the channel server; and
in response to a determination that one or more messages do not exist on the channel server for the particular user based on the card catalog of the particular user, displaying the card catalog of the particular user without additional information.

17. The identification system of claim 16, wherein displaying the card catalog of the particular user with additional information representative of the one or more messages that exist on the channel server comprises:
parsing, from messages on the channel server, one or more messages associated with the card catalog of the particular user;
creating one or more message screens based on the one or more messages parsed from the messages on the channel server; and
inserting one or more alert icons in the display of the card catalog of the particular user based on the one or more messages parsed from the messages on the channel server and the one or more message screens created.

18. A method comprising:
receiving, based on user input provided by a particular user, a request related to generating conveyable information for a particular vendor;
based on the request, searching mappings stored in a database using an identifier associated with the particular vendor, the mappings being mappings between vendor identifiers and rules useful in generating conveyable information that is used to identify a user or another item and that is in a format understandable by a system used by a vendor that corresponds to a vendor identifier and the mappings including at least:
a first mapping between a first vendor identifier and a first rule useful in generating conveyable information that is used to identify a user or another item and that is in a first format understandable by a system used by a first vendor that corresponds to the first vendor identifier, and
a second mapping between a second vendor identifier and a second rule useful in generating conveyable information that is used to identify a user or another item and that is in a second format understandable by a system used by a second vendor that corresponds to the second vendor identifier, the second mapping being different than the first mapping, the second vendor identifier being different than the first vendor identifier, the second rule being different than the first rule, the second format being different than the first format, and the second vendor being different than the first vendor;
based on results of the searching, determining, using a processor, at least one rule useful in generating conveyable information for the particular vendor, the determining at least one rule useful in generating conveyable information for the particular vendor comprising determining a transform needed to transform the identification information into the format understandable by the system used by the particular vendor;

determining, using the processor, identification information for a type of conveyable information requested by the particular user from which the request was received;

generating, using the processor, conveyable information understandable by a system used by the particular vendor by applying the determined at least one rule useful in generating conveyable information for the particular vendor to the determined identification information for the type of conveyable information requested by the particular user; and causing, at a mobile device, output of the generated conveyable information to enable identification of the type of conveyable information requested by the particular user to a system of the particular vendor through the output of the mobile device.

19. A mobile device application that is stored in a non-transitory computer-readable storage medium and that includes executable instructions that, when executed by a processing device, cause the processing device to perform operations comprising:

receiving, based on user input provided by a particular user, a request related to generating conveyable information for a particular vendor;

based on the request, searching mappings stored in a database using an identifier associated with the particular vendor, the mappings being mappings between vendor identifiers and rules useful in generating conveyable information that is used to identify a user or another item and that is in a format understandable by a system used by a vendor that corresponds to a vendor identifier and the mappings including at least:

a first mapping between a first vendor identifier and a first rule useful in generating conveyable information that is used to identify a user or another item and that is in a first format understandable by a system used by a first vendor that corresponds to the first vendor identifier, and a second mapping between a second vendor identifier and a second rule useful in generating conveyable information that is used to identify a user or another item and that is in a second format understandable by a system used by a second vendor that corresponds to the second vendor identifier, the second mapping being different than the first mapping, the second vendor identifier being different than the first vendor identifier, the second rule being different than the first rule, the second format being different than the first format, and the second vendor being different than the first vendor;

based on results of the searching, determining at least one rule useful in generating conveyable information for the particular vendor, the determining at least one rule useful in generating conveyable information for the particular vendor comprising determining a transform needed to transform the identification information into the format understandable by the system used by the particular vendor;

determining identification information for a type of conveyable information requested by the particular user from which the request was received;

generating conveyable information understandable by a system used by the particular vendor by applying the determined at least one rule useful in generating conveyable information for the particular vendor to the determined identification information for the type of conveyable information requested by the particular user; and causing, at a mobile device, output of the generated conveyable information to enable identification of the type of conveyable information requested by the particular user to a system of the particular vendor through the output of the mobile device.

* * * * *